400
United States Patent [19]

Bauman et al.

[11] Patent Number: 4,529,741

[45] Date of Patent: Jul. 16, 1985

[54] NONSLUMPING FOAMABLE POLYORGANOSILOXANE COMPOSITIONS CONTAINING SILICA AND FIBERS

[75] Inventors: Therese M. Bauman; Chi-Long Lee, both of Midland, Mich.

[73] Assignee: Dow Corning Corporation, Midland, Mich.

[21] Appl. No.: 664,914

[22] Filed: Oct. 26, 1984

[51] Int. Cl.³ .............................................. C08J 9/14
[52] U.S. Cl. .................................. 521/99; 521/91; 521/92; 521/122; 521/123; 521/154
[58] Field of Search ............... 521/99, 122, 123, 154, 521/92, 91

[56] References Cited

U.S. PATENT DOCUMENTS 4,229,548 10/1980 Sattleger et al. ................... 521/154
4,368,279 1/1983 Modic et al. ........................ 521/154

FOREIGN PATENT DOCUMENTS 2911971 10/1980 Fed. Rep. of Germany .

*Primary Examiner*—Morton Foelak
*Attorney, Agent, or Firm*—Robert Spector

[57] ABSTRACT

Moisture curable, foamable compositions that do not flow appreciably in the uncured state when applied on a vertical surface comprise an RTV elastomeric composition, a liquified blowing agent and finely divided silica in combination with either small diameter glass, metal or graphite fibers or carbon black. The RTV elastomeric composition comprises (1) at least one hydroxyl endblocked diorganosiloxane homopolymer or graft copolymer, and (2) an effective amount of a moisture reactive crosslinker for the hydroxyl endblocked polymer.

19 Claims, No Drawings

“NONSLUMPING FOAMABLE POLYORGANOSILOXANE COMPOSITIONS CONTAINING SILICA AND FIBERS”

BACKGROUND OF THE INVENTION

1. Field of the Invention

This invention relates to polyorganosiloxane foams. More particularly, this invention relates to one-part, nonslumping foamable polyorganosiloxane compositions that include liquified blowing agents. In the presence of atmospheric moisture and atmospheric pressure, the compositions form foams that cure with a minimum of collapse to yield useful, low density products.

2. Background Information

It is known to prepare foams by introducing a gaseous blowing agent such as compressed air into one-part, moisture curable polyorganosiloxane compositions that are typically employed as room temperature vulcanizable (RTV) sealants. A characteristic of known RTV compositions is the long time period required for these compositions to cure to the extent that the foam becomes self supporting. One way to maintain the cellular structure of the initially produced foam during curing is to maintain a flowable RTV polyorganosiloxane composition under reduced pressure in a vacuum chamber for a period of time sufficient to obtain a self-supporting foam. This technique is taught by Modic and Boudreau in U.S. Pat. No. 4,368,279, which issued on Jan. 11, 1983.

While the application of vacuum during curing may be practical for machine made foams such as slab stock and molded foams, this technique cannot be used when the foam is formed within a cavity of a building or other locations where it is not feasible to maintain the foam under vacuum during curing. In addition, the necessity of mixing in a gaseous blowing agent at the time the foam is formed requires that mixing and aerating equipment be transported to the location where the foam is to be installed. For some applications, particularly those requiring relatively small amounts of foam at remote locations, such equipment would not be practical. In these instances it would be considerably more convenient to employ a one-component foamable composition, including a blowing agent, packaged in a container that can be easily transported to the application site and which is capable of repeatedly dispensing the foamable composition without the need for additional processing steps or ingredients.

A second method for reducing the collapse of partially cured foams prepared using RTV polyorganosiloxane compositions is to incorporate fillers such as silica and calcium carbonate. Filled RTV compositions have been packaged in 2-compartment aerosol cans together with a compressed gas that supplies the pressure required to expel the composition from the can in addition to forming the cellular structure of the foam. One package foamable compositions are described in U.S. Pat. No. 4,229,548, which issued to Sattleger et al. on Oct. 21, 1980, and in German published application No. 2,911,971, which was published on Oct. 9, 1980. The cured foams are typically of relatively poor quality and characterized by cell concentrations of less than 4 per linear centimeter and densities from 0.58 to 0.81 g./cc due to drainage of uncured or partially cured liquid from the cellular structure of the foam during the curing process. The need to minimize collapse and flow of partially cured foams by the use of vacuum, by heating to accelerate curing, by the addition of large amounts of fillers and the resultant increase in foam density or by other means requiring additional material or processing steps may more than offset the advantages achieved by packaging foamable compositions in portable containers such as aerosol cans.

A disadvantage of silica-filled foamable compositions containing an amount of liquified blowing agent sufficient to reduce the density below 0.58 g./cc is that these compositions will flow for a distance of several centimeters when placed on a vertical or sloping surface. This phenomenon is referred to as "slumping."

The present invention is based on the discovery that the slumping resulting from incorporation of liquified blowing agents into prior art RTV foamable polyorganosiloxane compositions can be substantially reduced or eliminated by including in said composition the unique combinations of fillers described hereinafter. The resultant foams exhibit a desirable combination of low density, small average cell size and high cell concentration.

SUMMARY OF THE INVENTION

The nonslumping, one-part foamable polyorganosiloxane compositions of this invention comprise a conventional RTV elastomeric composition obtained by mixing a hydroxyl endblocked polydiorganosiloxane and a moisture reactive curing agent under substantially anhydrous conditions, a liquified blowing agent and a filler comprising finely divided silica in combination with glass, graphite or metal fibers and/or carbon black. The presence of platinum in the absence of tin or sulfur imparts flame retardancy to the compositions containing carbon black or a combination of glass or refractory oxide fibers and finely divided quartz.

DETAILED DESCRIPTION OF THE INVENTION

This invention provides a polyorganosiloxane composition which is stable when confined under superatmospheric pressure in the absence of moisture and when released into an area under atmospheric pressure forms a nonslumping moisture-curable foam, said composition consisting essentially of the product obtained by mixing under substantially anhydrous conditions and superatmospheric pressure (A) a moisture curable RTV elastomeric composition;

(B) at least 2%, based on the total weight of said composition, of finely divided silica;

(C) at least 10 percent, based on the weight of said composition, of a liquified blowing agent; and (D) at least one filler selected from the group consisting of glass fibers, metal fibers, graphite fibers and carbon black, where the total amount of said filler is sufficient to prevent slumping of said composition under atmospheric pressure and a temperature of 25° C.

The feature that characterizes the present foamable compositions and distinguishes them from prior art compositions is the combination of finely divided silica with a relatively large amount of carbon black or with fibers of glass, metal or graphite that exhibit the size range specified hereinabove. These materials are packaged together with a liquified blowing agent and a moisture curable RTV elastomeric polyorganosiloxane composition as a homogeneous composition in an aerosol can or other pressure resistant container.

RTV elastomeric compositions, referred to hereinafter as (A), are a known class of materials that are typically prepared by combining a moisture reactive crosslinker and a polydiorganosiloxane that can be cured in the presence of the crosslinker. These ingredients are usually combined under conditions that exclude atmospheric moisture. Optional ingredients such as curing catalysts, fillers, adhesion promoters, pigments and flame retarding agents can also be present.

Diorganosiloxane polymers suitable for use in (A) include homopolymers and graft copolymers containing at least 20 mole percent diorganosiloxane units. The polymers also contain a silicon-bonded hydroxyl group or at least two silicon-bonded hydrolyzable groups such as alkoxy at each of the terminal positions of the polymer molecules. Moisture curable RTV elastomeric compositions are sufficiently described in the prior art that a detailed description of these materials is not required in this specification.

For the purposes of this invention, it should suffice to say that hydroxyl endblocked polydiorganosiloxanes suitable for use in (A) can be prepared by the base catalyzed hydrolysis and polymerization of cyclic diorganosiloxanes under controlled conditions to yield polymers of the desired molecular weight.

The organic groups present on the silicon atoms of the diorganosiloxane polymers include hydrocarbon radicals containing from 1 to 20 or more carbon atoms. The carbon atoms are, in turn, bonded to hydrogen atoms or to other atoms, such as halogen, or groups of atoms that will not adversely affect the storage stability or curing of the present foamable compositions.

The silicon-bonded hydrocarbon radicals in the diorganosiloxane polymers are preferably methyl, vinyl, phenyl or 3,3,3-trifluoropropyl. This preference is based on the availability of the intermediates used to prepare these polymers.

The diorganosiloxane units of the homopolymer or graft copolymer can contain one or more of the aforementioned silicon-bonded hydrocarbon radicals in the form of repeating units such as dimethylsiloxane, diphenylsiloxane, methylphenylsiloxane and methyl-3,3,3-trifluoropropylsiloxane. Most preferably (A) includes at least one polydimethylsiloxane of the general formula $HO[Si(CH_3)_2O]_mH$ where m has an average value of from 60 up to about 600.

In addition to diorganosiloxane units, the organosiloxane portions of the polymers may contain small amounts, typically less than 0.5% by weight, of monoorganosiloxy, triorganosiloxy and $SiO_{4/2}$ units. These additional units result from impurities present in the starting material or intermediate used to prepare the polymer. The molar ratio of hydrocarbon radicals to silicon is preferably from 1.98 to 2.01.

Copolymers suitable for use in (A), either alone or in combination with polydiorganosiloxanes, are silanol endblocked graft copolymers and contain at least 20 mole percent of dimethylsiloxane units. The grafted units in the copolymers are derived from substantially linear organic polymers that can be of the condensation or addition type. Graft copolymers are discussed at length in a number of texts on the subject of polymer chemistry, including *Macromolecules* by Hans George Elias (Plenum Publishing Corporation, New York, N.Y., 1977) and the *Encyclopedia of Polymer Science and Technology* (Wiley-Interscience, New York, 1964).

One type of suitable diorganosiloxane graft copolymer can be prepared by the peroxide catalyzed polymerization of ethylenically unsaturated organic compounds in the presence of a liquid hydroxyl endblocked polydiorganosiloxane. A preferred class of graft copolymers is described in U.S. Pat. No. 3,555,109, which issued to J. C. Getson on Jan. 12, 1971. This patent is hereby incorporated herein by reference as a teaching of suitable diorganosiloxane graft copolymers.

The graft copolymers disclosed by Getson are characterized by the presence of rod-shaped particles measuring from 5 to 500 micrometers in length. The copolymers are prepared by reacting a substantially linear hydroxyl endblocked polydiorganosiloxane exhibiting a viscosity of up to 6 Pa.s at 25° C. with one or more olefinically unsaturated organic monomers such as styrene, ethylene, and esters of acrylic and methacrylic acids. The reactants are combined with an organic peroxide catalyst and the resulting mixture is stirred at a rate sufficient to produce rod-shaped particles of the desired size range. The relationship between particle size and shear rate is discussed in this patent. An example of this type of graft copolymer is a grafted hydroxyl terminated polydimethylsiloxane available as Silgan ® H-622 from SWS Silicones Corporation. Because at high concentrations this graft copolymer adversely affects certain desirable properties such as flame retardancy and weatherability exhibited by the cured foam, the concentration of graft copolymer should preferably not exceed about 40 weight % of the diorganosiloxane polymer portion of (A).

Ingredient (A) can contain two or more of the diorganosiloxane homopolymers or graft copolymers described hereinbefore, or a mixture of said homopolymers and copolymers.

The diorganosiloxane polymer portion of (A) preferably exhibits a viscosity of from 0.1 to 100 Pa.s at 25° C. Preferably this range is from 0.5 to 15 Pa.s. Within this preferred range, optimum combinations of practical dispensing rates for the composition and good stability of the foam during curing are achieved.

The diorganosiloxane polymer portion of (A) typically constitutes from 10 to 90% of the combined weight of (A), silica and other fillers discussed hereinbelow. Preferably this value is from 15 to 75%.

The moisture reactive crosslinker portion of (A) can be any polyfunctional organosilicon material that will react with hydroxyl-containing polyorganosiloxanes at room temperature in the presence of atmospheric moisture to form cured compositions. One class of suitable crosslinkers includes silanes of the general formula $R_n^1SiX_{4-n}$ where $R^1$ represents a monovalent hydrocarbon radical, X is a hydrolyzable group and the average value of n is less than 2 but greater than zero. X can be acyloxy such as acetoxy; alkoxy such as methoxy; ketoximo of the formula $-ON=CR_2^2$ where each $R^2$ is individually alkyl containing from 1 to 4 carbon atoms and is preferably methyl or ethyl; aminoxy of the formula $-ONR_2^2$; aminoxy of the formula $-ONR_2^2$; or amido of the formula $-N(R^3)C(O)R^2$; where $R^3$ is hydrogen or $R^2$.

To ensure compatibility between the crosslinker and diorganosiloxane polymer portions of (A), $R^1$ preferably represents a vinyl or a lower alkyl radical when the diorganosiloxane units of the polymer are dimethylsiloxane units.

In place of, or in addition to the foregoing silanes, the crosslinker can include partial hydrolysis products of these silanes or siloxanes that contain at least three silicon-bonded X groups per molecule.

Preferred crosslinkers for use in (A) include silanes where $R^1$ represents methyl or vinyl and X represents —OC(O)CH$_3$, —ON(C$_2$H$_5$)$_2$, —ON=C(CH$_3$)(C$_2$H$_5$) or —OCH$_3$.

The prior art teaches the relative reactivities of various crosslinkers for RTV compositions and catalysts that can be employed to increase these reactivities. Selection of an appropriate crosslinker and catalyst, if required, can be accomplished with at most a minimum of experimentation by those skilled in the art using available information.

The crosslinker should be one that rapidly produces a cured foam. The concentration of crosslinker should be sufficient to provide a storage stable composition. To achieve stability during storage, the molar ratio of hydrolyzable groups present in the crosslinker, represented by X in the foregoing formula, to the hydroxyl groups present in the ingredients used to prepare the foamable composition should be greater than 2:1. A molar ratio of at least 3:1 is preferred.

The preferred crosslinkers described hereinbefore are typically used at concentrations of from about 0.1 to about 10 parts by weight per 100 parts by weight of the organosiloxane polymer portion of (A).

The reactivity exhibited by some RTV crosslinkers can be considerably increased by the presence of relatively small amounts of catalysts. Useful catalysts include inorganic and organic tin compounds, such as stannous octoate and dibutyltin dilaurate, and titanium compounds. It is known that, (1) curing agents containing aminoxy groups of the formula (ONR$_2^2$) where $R^2$ is defined hereinbefore as the hydrolyzable group typically do not require catalysts, and (2) titanium compounds, particularly chelated titanium compounds, effectively catalyze the reaction between silicon-bonded hydroxyl and silicon-bonded alkoxy groups in the presence of atmospheric moisture.

When alkoxysilanes are used as the crosslinker, the present compositions can optionally include any of the known hydroxyl group scavengers that are disclosed, for example in U.S. Pat. No. 4,395,526, which issued to Chung on Jan. 3, 1984, and is incorporated herein by reference.

The present foamable compositions contain at least 2 percent by weight of finely divided silica. The silica in combination with the fillers discussed hereinafter, maintains the cellular structure of the foam until it has cured sufficiently to become self supporting. The silica and filler are also responsible for the "nonslumping" property of the foamable composition. As used herein, the term "nonslumping" implies that an uncured or partially cured foam composition will not flow more than about 1.5 cm. when applied to a substantially vertical surface to which the composition adheres.

Useful forms of silica include fumed and precipitated silicas having surface areas greater than about 100 m$^2$/g. The silica can be present in amounts of from 2 to about 30 percent by weight, based on the weight of the foamable composition. Preferably the silica constitutes from 10 to about 20% of the weight of the foamable composition. Fumed silicas are particularly effective for imparting nonslumping properties to the present compositions in combination with the other fillers of this invention.

Finely divided silica fillers are typically treated with relatively low molecular weight, liquid hydroxyl containing organic or organosilicon compounds to prevent a phenomenon referred to in the art as "crepe-hardening" of polyorganosiloxane compositions. The filler particles can be treated before being added to the composition or the particles can be treated "in situ" by having a suitable treating material present as an ingredient in the compositions. Known filler treating agents include hydroxyl-containing polydiorganosiloxanes where the hydrocarbon groups present on silicon are lower alkyl such as methyl or vinyl and can include phenyl and 3,3,3-trifluoropropyl groups. The hydroxyl groups present on the aforementioned polydiorganosiloxanes can be bonded to silicon or to one or more of the hydrocarbon substituents. Japanese Patent Publication No. 110662/78 discloses that liquid polyorganosiloxanes containing hydroxyalkyl or carboxyalkyl groups bonded to silicone are useful silica treating agents.

Fibers useful in the present filler compositions include chopped and flocked fibers that preferably exhibit lengths of up to 1.0 cm. and diameters of up to 15 micrometers. The fibers are formed from glass, graphite or a metal such as aluminum, steel or nickel. The term "metal fibers" is intended to include nonmetallic fibers such as graphite that have been coated with a metal such as nickel. The fibers are employed at concentrations of from 3 to 30 percent by weight, based on the weight of the foamable composition. The preferred concentration range for a given type of fiber is believed to be a function of the ease with which the quantity of fibers added can be uniformly dispersed in the present foamable compositions. If the fibers have a strong tendency to form aggregates or agglomerates, it may not be feasible to incorporate more than about 15% by weight of the fibers into a foamable composition that can be continuously discharged through any of the conventional aerosol values. The optimum concentration range for any particular type of fiber that is within the dimensional limits defined hereinabove can readily be determined with a minimum of routine experimentation using as a basis the compositions disclosed in the accompanying examples.

Fibers of glass, graphite and aluminum are preferred for use in the present compositions on the basis of their cost and availability. Nonmetallized fibers formed from refractory materials such as aluminum silicate do not produce nonslumping foams.

Glass fibers are particularly preferred because their presence makes it possible to substantially increase the amount of liquified blowing agent over the maximum amount that can be present in a nonslumping formulation that contains silica as the only filler and the same (A) portion. The increased concentration of blowing agent can result in a density reduction of up to 50% or more relative to foams prepared from a nonslumping formulation without glass fibers.

If carbon black is used in combination with a finely divided silica to obtain a filler composition of this invention, any available type of finely divided carbon black is suitable for this purpose. Materials classified as carbon blacks include, but are not limited to lamp blacks, furnace blacks, channel blacks, acetylene blacks and thermal carbon blacks.

Typically the carbon black constitutes from 5 to 30 percent of the total weight of the foamable composition. More than about 30 percent does not apparently contribute additional useful properties to the foamable composition, and represents an unnecessary additional expense. Less than about 5 percent does not provide the desired nonslumping property in combination with finely divided silica. The concentration of carbon black in preferred compositions is from 5 to 15 percent by weight.

Carbon black may be the filler of choice if it is desired to avoid the substantial decrease in elongation of cured foams containing some types of fibers that are within the scope of this invention. In some instances, this decrease can amount to as much as 80% of the elongation exhibited by an otherwise identical composition in which the fibers are omitted.

The presence of finely divided silica in combination with either the aforementioned types of fibers or carbon black in the compositions of this invention makes it possible to prepare useful foams in the absence of other foam stabilizing additives. Organosiloxane copolymers that are useful as foam stabilizers for polydimethylsiloxane compositions containing a liquified or gaseous blowing agent and packaged in aerosol containers are disclosed in a copending application filed concurrently herewith as Ser. No. 665,272 filed Oct. 26, 1984 in the names of C. L. Lee and J. S. Rabe.

In the absence of tin- and sulfur-containing compounds, some foamable compositions containing carbon black or from 15 to 50 weight percent of quartz can be made flame retardant by adding a small amount of a platinum-containing material. Typically the required concentration of platinum is between 1 and 150 parts per million parts by weight of the foamable composition. The platinum-containing material can be platinum metal or a platinum compound such as chloroplatinic acid. The use of platinum in combination with carbon black as a flame retarding agent for RTV polyorganosiloxane compositions is taught in U.S. Pat. No. 3,734,881, which issued to R. Shingledecker on May 22, 1973. This patent discloses self-extinguishing RTV organosiloxane elastomer compositions containing crosslinkers of the general formula $CH_2=CHSiX_3$ where X represents an acetoxy or ketoximo group. The patent is incorporated herein in its entirety by reference.

The foamable polyorganosiloxane compositions of this invention are converted to foams by the action of blowing agent (C). The blowing agent is a gas under ambient conditions, but is liquified under the superatmospheric pressure used to package and store the foamable compositions. When the composition is released from the storage container, it is converted to a froth by volatilization of the blowing agent. Over a period of from several minutes to several hours, the froth cures to a solid, elastomeric foam in the presence of atmospheric moisture.

Ingredient (C) can be any material that boils below 25° C. under atmospheric pressure, can be liquified under the pressure used to store the present compositions, and when liquified is both miscible and unreactive with said compositions. Suitable liquifiable blowing agents include aliphatic hydrocarbons containing three or four carbon atoms. Butane, isobutane and mixtures of isobutane and propane are particularly preferred on the basis of their cost and availability. Chlorofluorocarbons such as trifluorochloromethane will function as blowing agents, but in some countries are considered undesirable for ecological reasons.

Ingredient (C) can constitute from about 10 to about 50% of the total weight of the present foamable compositions. The optimum concentration range is dependent upon a number of variables, the most influential of which appears to be the viscosity of the foamable composition, which is, in turn, to a large extent dependent upon the viscosity of (A) and the amount of silica and other filler(s) present.

The optimum concentration of (C) is one that will provide the best balance between stability of the froth during curing, a sufficiently rapid discharge rate of the composition from the container in which it is stored and a relatively low density cured foam.

An excessive amount of blowing agent will produce a "slumping" foam. Too low a concentration of blowing agent in a viscous composition will typically yield a high density foam. For preferred foamable compositions such as those exemplified hereinafter, the concentration of blowing agent is preferably from 10 to 30 percent, based on the weight of the entire foamable composition.

In the absence of blowing agent, the foamable compositions of this invention are typically thick, pasty materials. For this reason it is desirable to package them in 2-compartment containers wherein only one compartment is equipped with a valve and contains the foamable composition and liquified blowing agent. The second compartment is separated from the first by means of a piston or a flexible container and is filled with a propellant that can be of the same composition as the blowing agent or can be a more volatile material. The propellant provides the additional pressure required to expel the composition from the container at a rate that will produce a foam within the scope of this invention. Two-compartment aerosol cans are known in the art and can be equipped with any of the known types of aerosol valves.

The foamable compositions of this invention can be prepared by packaging all of the ingredients under substantially anhydrous conditions in a moisture-tight container, such as a two-compartment aerosol can, that is cable of withstanding the pressure exerted by the liquified blowing agent and any propellant employed.

In accordance with one such preparative method, the polymer portion of (A), silica, fibers, and any optional additives such as pigments, adhesion promoters and flame-retarding agents are blended to homogeneity before being combined and blended with the crosslinker portion of (A) and any curing catalyst under conditions that avoid contact between these ingredients and atmospheric moisture.

The amount of shear to which the composition is subjected during the blending operation should be minimized to avoid excessive damage to the fibers. Preferably the ingredients are blended in a mixer conventionally used for doughs. The resultant homogeneous composition is then transferred into a pressurizable container that is equipped with a dispensing valve. The desired amount of blowing agent (C) is then introduced into the container by appropriate means, usually through the dispensing valve, and the container is shaken to uniformly disperse the blowing agent throughout the composition. Methods and equipment for packaging moisture-sensitive materials together with liquified propellants such as isobutane in pressured containers are well known in the art and do not form part of this invention.

The pressurized containers used to package the foamable compositions are equipped with valves wherein the passages through which the composition flows are of sufficient diameter to permit discharge of the composition at a sufficiently rapid rate to form a useful foam. If the composition will be dispensed in portions over a period of several days or weeks, those passages within the valve and spray head that are exposed to atmospheric moisture should be capable of being sealed to minimize contact with atmospheric moisture and resultant curing of foamable composition remaining in these passages. It is desirable that the passages be of a sufficient diameter to facilitate removal of any residual previously dispensed material that has cured in the passage.

Preferably the valves are of the toggle type recommended for dispensing relatively viscous, foamable materials such as whipped cream. Most preferably the discharge tube and valve body are combined in a single structure that is held in place by an elastomeric valve seat. One or more openings in the valve body are normally closed off by contact with the seat. Displacement of the discharge tube by finger pressure moves the opening(s) in the valve body away from the seat, thereby allowing the contents of the pressurized container to flow into the valve body and through the discharge tube.

Aerosol valves wherein the valve body and spray head are separate units, and the valve is equipped with a spring loaded piston, are also suitable for dispensing the present foamable compositions.

As disclosed hereinbefore, preferred foamable compositions of this invention are stable for periods of up to six months or more when stored in two-compartment, pressure-tight containers that exclude atmospheric moisture.

Cured foams prepared using the compositions of this invention are typically of the closed cell type. The size of the cells in the foam will typically be less than 4 mm in diameter. Preferably the cells will range from 0.2 to 2 mm in diameter and the cell concentration is typically greater than 4 per linear cm.

Cured foams prepared from the present compositions can be used in many applications where it is desirable to utilize the unique properties of moisture curable polyorganosiloxane elastomers in a lower density, nonslumping material. The lower density of the foams relative to the corresponding noncellular elastomers makes it possible to cover a larger area with the same weight of material. An additional advantage is the insulating properties provided by the closed cell structure of the foam.

The ability of the present foamable compositions to remain stable in a pressurized container makes it possible to combine in a single, portable package such as an aerosol container, all of the ingredients required to form a moisture curable foam. The package can then be transported to the location where the foam is to be applied rather than having to transport the individual ingredients to the location, combine them in the required amounts and blend the resultant mixture into a homogeneous composition just prior to forming the foam. This is particularly advantageous in those instances when relatively small amounts of foam are dispensed over a relatively long period of time.

For a large scale foam preparation where storage stability is not a requirement, a mixture containing all ingredients of the foamable composition except the blowing agent is metered from one container, and a liquified blowing agent such as isobutane is metered from a pressurizable container into a common outlet that leads into a suitable mixing head. The resultant composition is dispensed from the mixing head as a foam at the desired location. This procedure is useful for preparing slab stock foam.

The following examples disclose preferred embodiments of the present foamable compositions and should not be interpreted as limiting the scope of the accompanying claims. All parts and percentages are by weight unless otherwise indicated.

EXAMPLE 1

This example demonstrates the relationship between the amounts of silica, fibers and blowing agent present in a foamable composition and the extent to which the composition slumps when applied into a vertically oriented groove.

Homogeneous mixtures were prepared by blending (1) 100 parts of a hydroxyl-terminated polydimethylsiloxane exhibiting a viscosity of 14 Pa.s at 25° C., (2) fume silica (MS-7 from the Cab-O-Sil Corporation), (3) a hydroxyl-terminated polymethylphenylsiloxane containing 4.5 percent silicon-bonded hydroxyl groups, and (4) glass filaments exhibiting lengths of from 0.1 to 8 mm. and diameters of from 2.6–3.8 micrometers. These filaments are available as Tempstran ® code 112 glass fibers from the Johns-Manville Corporation.

The resultant mixture was placed in a Sem Kit ® tube and degassed by application of a partial vacuum. Sem Kit tubes are available from Semco, Inc., a division of Products Research and Chemical Company, Glendale, Calif. This device is a cylinder formed from polyethylene and incorporates means for adding ingredients and stirring the contents of the tube in the absence of moisture. To the degassed mixture were added (5) $CH_3Si[ON=C(CH_3)(C_2H_5)]_3$ as the crosslinker together with 0.2 part of dibutyltin dilaurate as the curing catalyst. The resultant composition was mixed for 3 minutes, after which it was transferred into the flexible inner container of a Sepro ® aerosol can, available from The Continental Group, Inc. A toggle type valve assembly providing access to the flexible container was attached to the can by crimping and the contents of the inner container were degassed. From 3 to 12 parts, depending upon the viscosity of the particular composition, of a liquified gas containing 80 percent isobutane and 20 percent propane were introduced into the outer compartment of the can and an amount of liquified isobutane equivalent to 18 percent, based on the weight of the total foamable composition, including filler, was introduced as the blowing agent into the inner container through the valve. The can was then shaken on a mechanical shaker for about 16 hours to disperse the isobutane throughout the foamable composition.

Compositions that contained silica and no glass filaments were used as controls. The concentrations of polymethylphenylsiloxane (3) and crosslinker (5) were based on the silica content in accordance with the following weight ratios:

| Silica (parts) | Parts of (3) | Parts of (5) |
| --- | --- | --- |
| 3 | 0.9 | 6 |
| 11 | 3.45 | 8 |
| 20 | 6 | 10 |

Foams were prepared by discharging a portion of the contents of each aerosol can into a vertically oriented groove measuring 0.6 cm. in width and 0.6 cm. in height to form a 5 cm.-long bead. The walls and base of the groove were of aluminum. The distances that the composition flowed in five minutes was recorded as the slump value. The density of each of the foams was also measured.

The data in the following Tables 1 A, 1 B and 1 C demonstrate that while it is possible to prepare a non-slumping foam without the present fibers at high levels of silica or using a minimum amount of blowing agent, the glass fibers make it possible to prepare a nonslumping foam of relatively low density by increasing the amount of blowing agent and decreasing the silica content, thereby considerably reducing the density of the cured foam. This is particularly desirable when the foam is being used as an insulating material.

The concentration of blowing agent is expressed in terms of weight percent, based on the weight of the entire foamable composition.

TABLE 1 A

Effect of varying fiber and blowing agent content.

| Silica (parts) | Glass Fibers (parts) | Blowing Agent (weight %) | Density (g/cc) | Slump (cm.) |
|---|---|---|---|---|
| 3 (control a) | 0 | 19 | 1.0 | 7.6 |
| 3 (control b) | 12.5 | 41 | 1.0 | 7.6 |
| 3 | 12.5 | 11 | 0.62 | 0 |
| 3 | 25 | 20 | 1.1 | 0.4 |
| 20 (control c) | 0 | 20 | 0.61 | 0 |
| 20 | 12.5 | 11 | 0.88 | 0 |
| 20 | 25 | 19 | 0.53 | 0 |

Control b demonstrates that the level of blowing agent was too high for a composition containing only 15.5 parts of combined silica and fibers.
Control c demonstrates that nonslumping foams can be obtained without fibers if the silica level is sufficiently high.

TABLE 1 B

Effect of varying silica and blowing agent content

| Glass Fibers (parts) | Silica (parts) | Blowing Agent (weight %) | Density (g/cc) | Slump (cm.) |
|---|---|---|---|---|
| 12.5 | 20 | 38 | 0.51 | 7.6 |
| 12.5 | 11.5 | 14 | 0.51 | 0 |
| 12.5 | 3 | 11 | 0.62 | 0.1 |
| 25 | 3 | 20 | 1.1 | 0.4 |
| 25 | 11.8 | 13 | 0.64 | 0 |
| 25 | 11.5 | 38 | 0.54 | 0 |
| 0 (control d) | 11.5 | 13 | 0.50 | 0.2 |
| 0 (control e) | 3 | 19 | 1.0 | 7.6 |
| 0 (control f) | 11.5 | 38 | 0.56 | 7.6 |

Control d exhibited minimal slumping because of relatively low blowing agent content.

TABLE 1 C

Effect of varying silica and fiber content

| Blowing Agent (Weight %) | Silica (parts) | Fibers (parts) | Density (g/cc) | Slump (cm.) |
|---|---|---|---|---|
| 10.9 | 20 | 12.5 | 0.88 | 0 |
| 10.9 | 3 | 12.5 | 0.62 | 0.25 |
| 19.2 | 20 | 25 | 0.53 | 0 |
| 19.8 | 11.5 | 12.5 | 0.58 | 0.1 |
| 37.9 (control g) | 20 | 12.5 | 0.51 | 7.6 |
| 38.1 | 11.5 | 25 | 0.54 | 0 |
| 40.7 (control h) | 3 | 12.5 | 1.0 | 7.6 |

Controls g and h demonstrate that a higher concentration of glass fibers and/or silica is required to achieve nonslump properties at high concentrations of blowing agent.

EXAMPLE 2

This Example demonstrates the low foam density and desirable tensile properties that can be achieved using a preferred glass fiber.

A foamable composition was prepared and packaged using the ingredients and procedure described in the preceding Example 1, with the addition of 1.75 parts of a partially hydrolyzed $H_2N(CH_2)_2N(H)CH_2CH_2CH_2Si(OCH_3)_3$ as an adhesion promoter. The composition also contained 100 parts of the polydimethylsiloxane of Example 1, 13 parts of silica equivalent to 7.4 weight percent, 3.25 parts of the polymethylphenylsiloxane of Example 1, 5 parts of the glass fibers, 10 parts of the crosslinker of Example 1, 0.24 part of dibutyltin dilaurate and 24.5 percent, based on the weight of the foamable composition, of isobutane as the blowing agent.

After being packaged in a 2-compartment aerosol can, the composition formed a nonslumping foam under the conditions described in Example 1.

Specimens for measuring the tensile strength, elongation and modulus of the cured foam were prepared by discharging adjacent and slightly overlapping "beads" of a foamable composition on a horizontal aluminum panel and allowing the resultant layer of foam to cure for at least 4 days. The cured layer measured from 0.5 to 0.8 cm in thickness. Dumbbell-shaped bars measuring 0.63 cm in width at the narrowest dimension were cut from this layer and evaluated using an Instron ® tester. The crosshead speed was 12.7 cm per minute. Three samples of each type of foam were tested to obtain a deviation.

| Tensile Strength | Elongation | Modulus | Density |
|---|---|---|---|
| 276 + 7 kPa | 61 + 8% | 159 + 14 kPa | 0.35 g/cc |

This density value is considerably lower than any reported in Table 1 of Example 1.

EXAMPLE 3

This example demonstrates the level of flame retardancy exhibited by foamable compositions of this invention that contain platinum or a platinum compound in combination with carbon black or finely divided quartz.

Foamable compositions were prepared using the ingredients and procedure described in the preceding Example 2. In addition to the types and amounts of ingredients specified in Example 2, one of the compositions (I) contained an amount of chloroplatinic acid equivalent to 123 parts by weight of platinum per million parts of foamable composition and 25 parts of finely divided quartz exhibiting an average particle size of 5 microns. A second composition (II) omitted the dibutyltin dilaurate curing catalyst of (I) and replaced the $CH_3Si[ON=C(CH_3)(C_2H_5)]_3$ crosslinker with an equal weight of $CH_2=CHSi[ON=C(CH_3)(C_2H_5)]_3$. The third composition (III) omitted the dibutyltin dilaurate of (I) and contained 20 parts of lampblack in place of the quartz and an amount of chloroplatinic acid equivalent to 30 parts by weight of platinum per million parts of foamable composition. In all instances the chloroplatinic acid was added as a solution in isopropanol. Compositions I, II and III all produced nonslumping foams that cured in the presence of atmospheric moisture.

Foam samples were prepared from compositions I, II and III and tested in accordance with the Underwriters Laboratory flammability test designated as UL94, vertical burning test. The samples were in the form of strips measuring 12.7 cm. long by 1.3 cm. wide by 0.7 cm. thick. The samples were each placed in the 1.3 cm.-high flame of a Bunsen burner for two intervals of 10 seconds each and the time interval required for the flame to self extinguish following each exposure ($t_1$ and $t_2$) was measured and is recorded in the following Table 2. Each of the time values represents the average of five samples. The percentage of the original sample weight that was lost during the test is also reported.

TABLE 2

| Sample No. | Cross-linking Agent | Lamp-black (parts) | Quartz (parts) | Platinum (PPM) | SET (sec.) $t_1$ | SET (sec.) $t_2$ | Weight Loss (%) |
|---|---|---|---|---|---|---|---|
| I | MTO | 0 | 25 | 123 | 136 | N.D. | 20 |
| II | VTO | 0 | 25 | 123 | 1–3.5 | 1.5–4 | 0.3–0.9 |
| III | MTO | 20 | 0 | 30 | (a) 10 | 16 | 0.7 |
|  |  |  |  |  | (b) 11 | 67 | 4.2 |

SET = Self-extinguishing time
Sample I was completely consumed following second flame application.
Value for $t_2$ could not be determined.
MTO = CH$_3$Si[ON=C(CH$_3$) (C$_2$H$_5$)]$_3$
VTO = CH$_2$=CHSi [ON=C(CH$_3$) (C$_2$H$_5$)]$_3$
Sample III was tested for flame retardancy using only 2 samples, designated (a) and (b).

In addition to the self-extinguishing times (SET) listed in Table 2, sample II met all of the criteria of the UL 94 vertical burning test, including not having a total combustion time exceeding 50 seconds for the 10 flame applications on a set of 5 specimens;

not having any specimens which burn with flaming or glowing combustion up to the holding clamp;

not having any specimens which drip flaming particles that ignite dry absorbent surgical cotton located 30.5 cm. below the test specimen; and not having any specimens with glowing combustion which persists beyond 30 seconds after the second removal of the test flame.

Samples I and III did not meet all of the foregoing criteria. Sample II had a total combustion time for the five samples of 20.9 seconds.

EXAMPLE 4

This Example demonstrates the effect of shear during processing of foamable compositions containing Tempstran ® glass filaments on the tensile properties and density of cured foams prepared from these compositions.

Two foamable compositions were prepared using the types and amounts of organosiloxane polymers, crosslinker, curing catalyst, adhesion promoter, silica, and blowing agent specified in the preceding Example 2. The compositions also contained 20 parts by weight of Tempstran ® glass filaments exhibiting diameters of from 0.2 to 0.5 micrometers. Prior to being placed in the Sem Kit ® tube described in Example 1, one of the compositions (IV) was manually mixed with the glass filaments and then given five or six passes through a three-roll mill. The second composition (V) was prepared by blending all of the ingredients, with the exception of blowing agent, in a dough-type mixer and passing the resultant mixture twice through a three-roll mill. The curing agent adhesion promoter and curing catalyst were added after the composition had been transferred into the Semkit ® tube.

Composition V was subjected to considerably less shear than composition IV, and the cured foam exhibited a higher tensile strength, lower elongation and a slightly higher density than the foam prepared using composition IV.

The type and amount of blowing agent, the procedure for packaging the foamable composition in a Sepro ® can and the procedure for measuring physical properties are described in Example 1.

TABLE 3

| Foamable Composition | Density (g/cc) | Tensile Strength (kPa) | Elongation (%) |
|---|---|---|---|
| IV | 0.62 | 345 + 7 | 30 + 8 |
| V | 0.70 | 545 + 70 | 25 + 1 |

EXAMPLE 5

This Example demonstrates the effect of graphite, aluminum and ceramic fibers in reducing the slumping of foam prepared using moisture-curable polyorganosiloxane compositions.

Three foamable compositions were prepared and packaged using the procedure and ingredients, with the exception of glass fibers, disclosed in Example 2. The concentration of each ingredient was identical to that of Example 2 except for the isobutane, which constituted 18 percent by weight of the reaction mixture, and dibutyltin dilaurate, which was used at a concentration of 0.4 part. The foamable composition contained 8% silica, 18% isobutane and 3.1% of one of the three fiber candidates:

(a) aluminum fibers exhibiting a length of 0.3 cm. and a diameter of less than 8 micrometers, (b) graphite fibers exhibiting a length of 0.3 cm. and a diameter of 8 micrometers, (c) a ceramic fiber formed from alumina and silica and available as Fiberfrax ® fibers from the Carborundum Corporation. These fibers are outside the scope of the present invention, and were used as a control.

The foams obtained from the compositions containing the aluminum and graphite fibers were nonslumping when dispensed into a vertical groove as described in Example 1. The foam containing the ceramic fibers flowed down the groove for a distance greater than 1.5 cm. during the 5 minute interval following dispensing of the composition, and could not be classified as nonslumping.

The density, average cell size, cell size range and cell concentration of the cured foams containing the aluminum, graphite and ceramic fibers are listed in the following Table 4.

TABLE 4

| Fiber | Avg. Cell Size (mm) | Cell Size Range (mm) | Cell Concentration (cells/cm.) | Density (g/cc) |
|---|---|---|---|---|
| Aluminum | 0.3 | 0.1–1 | 10 | 0.51 |
| Graphite | 0.5 | 0.2–1.5 | 10 | 0.67 |
| Ceramic (control) | 0.8 | 0.3–2 | 8 | N.D. |

These data demonstrate that the type of fiber present in the foamable composition is critical to obtaining the nonslumping property that characterizes the compositions of this invention. The density of the foam containing the ceramic fiber was not determined because the composition flowed excessively prior to curing.

That which is claimed is:

1. A polyorganosiloxane composition which is confined under superatmospheric pressure in the absence of moisture and when released into an area under atmospheric pressure forms a nonslumping moisture-curable foam, said composition consisting essentially of the product obtained by mixing under substantially anhydrous conditions and superatmospheric pressure (A) a moisture curable RTV elastomeric composition;

(B) from 2 to 30 percent, based on the total weight of said composition, of finely divided silica;

(C) from 10 to 50 percent, based on the weight of said composition, of a liquified blowing agent; and (D) at least one filler selected from the group consisting of glass fibers, metal fibers, graphite fibers and carbon black, where the total amount of said filler is sufficient to prevent slumping of said composition under atmospheric pressure and a temperature of 25° C., wherein the concentration of said fibers is from 3 to 30 percent, and the concentration of carbon black is from 5 to 30 percent, wherein all percentages are by weight, based on the weight of the composition.

2. A composition according to claim 1 where said fibers are glass, aluminum or graphite.

3. A composition according to claim 1 where said composition is flame retardant and contains carbon black, from 1 to 150 parts by weight per million parts of said composition of platinum in the form of elemental platinum or a platinum compound, and free of tin, sulfur, tin compounds and sulfur compounds.

4. A composition according to claim 1 where said composition is flame retardant and contains glass fibers, from 5 to 30 percent by weight, based on the weight of said composition, of finely divided quartz, from 1 to 150 parts by weight per million parts of said composition of platinum in the form of elemental platinum or a platinum compound and free of tin, sulfur, tin compounds or sulfur compounds.

5. A composition according to claim 1 where said moisture-curable RTV elastomeric composition comprises the product obtained by mixing under substantially anhydrous conditions (a) at least one hydroxyl endblocked diorganosiloxane homopolymer or graft copolymer, and (b) an amount of a moisture reactive crosslinker sufficient to cure (a) in the pressure of atmospheric moisture.

6. A composition according to claim 5 where said diorganosiloxane polymer exhibits a viscosity of from 0.1 to 100 Pa.s at 25° C.

7. A composition according to claim 5 where said diorganosiloxane polymer is a polydimethylsiloxane.

8. A composition according to claim 5 where said moisture reactive crosslinker comprises a silane of the general formula $R_nSiX_{4-n}$, a partial hydrolyzate thereof or a siloxane containing at least 3 silicon-bonded X groups per molecule, where $R^1$ is a monovalent hydrocarbon radical, X is a hydrolyzable group and the average value of n is less than 2 and greater than zero.

9. A composition according to claim 8 where $R^1$ is methyl or vinyl, X is acyloxy, alkoxy, ketoximo, $-ONR_2^2$ where $R^2$ represents alkyl containing from 1 to 4 carbon atoms, and $-N(R^3)C(O)R^2$ where $R^3$ is hydrogen or $R^2$.

10. A composition according to claim 8 where X is $-OC(O)CH_3$, $-ON(C_2H_5)_2$, $-ON=C(CH_3)(C_2H_5)$ or $-OCH_3$.

11. A composition according to claim 8 where the molar ratio of X groups to the total number of hydroxyl groups in said composition is at least 3.

12. A composition according to claim 1 where said composition includes an effective amount of a curing catalyst.

13. A composition according to claim 12 where said catalyst is an organic or inorganic tin compound or a titanium compound.

14. A composition according to claim 1 where said composition contains a treating agent for said silica.

15. A composition according to claim 14 where said treating agent is a liquid hydroxyl endblocked polydiorganosiloxane.

16. A composition according to claim 1 where said composition is packaged in a container under superatmospheric pressure and substantially anhydrous conditions.

17. A composition according to claim 16 where said container is a two-compartment aerosol can.

18. A closed cell polyorganosiloxane foam comprising a moisture cured polorganosiloxane elastomer containing uniformly dispersed therein from 5 to 50 percent by weight, based on said elastomer, of finely divided silica and at least one member selected from the group consisting of carbon black at a concentration of from 5 to 30 percent by weight, based on said elastomer, and from 5 to 50 percent by weight, based on said elastomer, of fibers formed from glass, metal or graphite where said fibers exhibit diameters of up to 15 micrometers and lengths of up to one centimeter.

19. A closed cell foam according to claim 18 where said fibers are formed from glass, aluminum or graphite.

* * * * *